May 17, 1960 E. A. MEYER 2,936,668
STUD RETAINING SPRING CLIP
Filed Sept. 17, 1956

INVENTOR.
Engelbert A. Meyer
BY
L. D. Burek
ATTORNEY.

United States Patent Office 2,936,668
Patented May 17, 1960

2,936,668

STUD RETAINING SPRING CLIP

Engelbert A. Meyer, Detroit, Mich., assignor to General Motors Corporation, Detroit, Mich., a corporation of Delaware Application September 17, 1956, Serial No. 610,144

2 Claims. (Cl. 85—36)

This invention relates to fasteners in general and particularly to stud retaining fasteners formed from a sheet metal stamping.

It is here proposed to provide a new and improved fastener for retaining stud members within a receiving aperture. The proposed fastener is particularly adapted for use with ornamental moldings such as are applied to automotive vehicle bodies.

Figure 1:
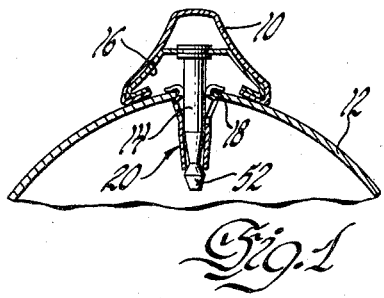
Figure 1 is a cross-sectioned view of a vehicle fender crown having an ornamental molding retained thereto by the proposed fastener clip.

The stud retaining fastener clip shown by Figure 1 is adapted for use with an ornamental molding 10 disposed on the crown of a vehicle fender 12. The molding member is adapted to receive a stud member 14 which includes clip means 16 for fastening the stud thereto. An access 18 is formed through the fender crown to receive the proposed stud retaining fastener clip 20; which in turn receives and retains the stud member.

Figure 4:
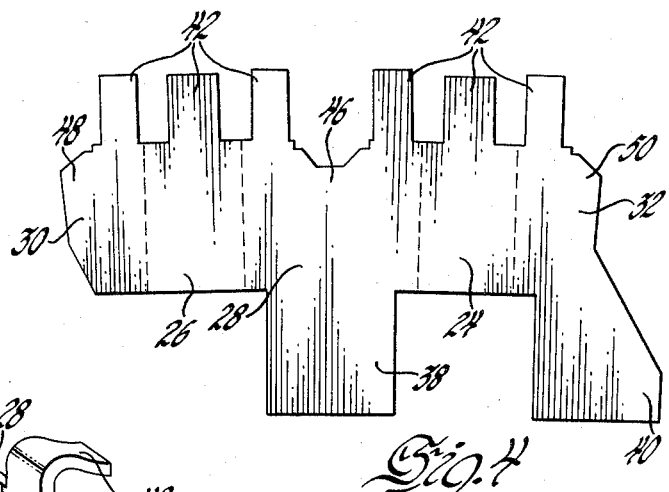
Figure 4 is a view of the sheet metal stamping from which the proposed fastener clip is formed.
Figure 5:
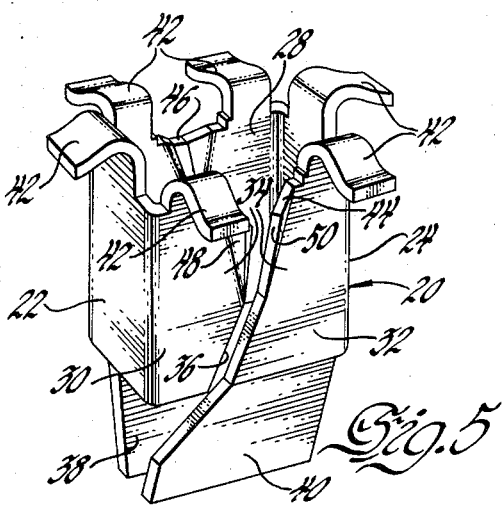
Figure 5 is a perspective view of the proposed fastener.

The fastener clip 20 is formed from a sheet metal blank cut to the form shown by Figure 4. The blank is formed to provide a clip having a rectangular body portion 22 including end walls 24 and 26 with a wider side wall 28 therebetween. The ends 30 and 32 of the blank are disposed in spaced planar relation to provide the other side wall 34. The spacing of ends 30 and 32 provides a gap 36 which allows for the contraction of the body portion 22 during its assembly within the access 18 of the fender wall 12.

Depending and inwardly inclined tabs 38 and 40 are formed from the lower ends of side walls 28 and 34 for engaging and retaining the stud 14 as received therebetween. The gap 36 is formed diagonally across the side wall portion 34 of the clip body and across a part of the tab 40. The tab 40 is actually formed wholly from the end 32 of the stamped blank in a manner to provide a terminal edge extending across the full width of the clip side walls just as does tab 38.

A plurality of tabs 42 are formed from the upper ends of the end and side walls 22, 24, 28 and 34 and are bent outwardly to provide spring fingers for engaging the upper surface of the wall 12 about the access 18 within which the clip is received. These tabs prevent the clip from passing on through the receiving wall. Shoulder portions 44 and 46 are formed from the side walls 28 and 34, between a pair of the spring finger tabs 42, to engage the under surface of the receiving wall and prevent inadvertent withdrawal of the clip. Shoulder portion 46 is provided by forming the upper edge of the side wall 28 outwardly while the other shoulder 44 is made by bending the upper corners 48 and 50 of the ends of the blank outwardly. The inclined surfaces provided on the shoulder portions 44 and 46 allow tolerance spacing between the spring finger tabs and shoulders while still assuring a bite into the under surface of the wall supporting the clip member.

In assembly of the clip within the supporting fender wall 12, the body portion 22 is pressed together and inserted in the access 18. When released the side walls expand to allow shoulders 44 and 46 to engage the underside of the receiving wall which, with tabs 42 in engagement with the upper surface thereof, retains the clip in secured position for receiving the stud member.

Figure 2:
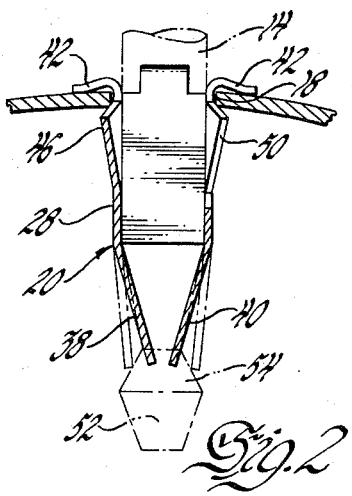
Figure 2 is an enlargement of that part of Figure 1 showing the proposed fastener.
Figure 3:
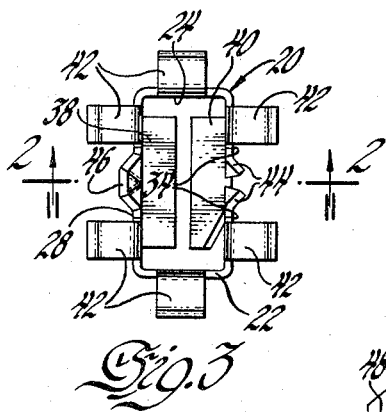
Figure 3 is a top view of the proposed stud retaining fastener clip.

The particular stud member 14 here shown has a head 52 formed at its terminal end and is necked down behind the head, as shown by Figure 2, to provide an inclined surface 54 on the stud for the tabs 38 and 40 to bite into to prevent the inadvertent withdrawal of the stud from the clip.

The width of the stud engaging tabs 38 and 40 enables the studs to be received at any position therebetween. The studs need not be precisely located with respect to the center of the clip. Such leeway is of great advantage not only in assembly operations but in reducing the close tolerance otherwise required in locating receiving holes relative to studs to be inserted therein.

The proposed stud retaining clip is inexpensive to manufacture, simple to install and dependable in operation.

I claim:

1. In combination, a stud member and a stud retaining spring clip; said stud retaining spring clip being formed from a sheet metal blank to provide a rectangular body portion receivable within a substantially complementary access formed in a supporting wall member, said body portion including two end walls and a longer side wall therebetween and having the ends of said blank disposed in planar relation to provide a second side wall and a gap therebetween centered at the top of said second side wall and extending diagonally therefrom to one of the lower corners of said body portion to allow for the contraction of said clip body incident to assembly within said access, a plurality of spring tabs formed from the upper ends of said side and end walls and bent and disposed to engage one side of said supporting wall member about said access, shoulder portions formed from said one side wall between adjacent of said spring tabs and from the ends of said blank forming said second side wall and between adjacent spring tabs thereof for engaging the under side of said supporting wall member about said access, said spring tabs and shoulder portions cooperating to engage said body portion to said supporting wall, stud engaging tabs formed and extended from the lower ends of said side walls and converging inwardly toward each other apart from said body portion and being substantially the width of said side walls at the ends thereof for engaging a stud member received through said body portion at any position between the end walls thereof, and said stud member being generally circular in cross-section and of substantially less diameter than the length of said stud engaging tabs such that said stud member may be received and retained by said tabs in any position in which said stud member is inserted in said stud retaining clip.

2. In combination, a stud member and a stud retaining clip, said stud retaining spring clip being formed from a sheet metal blank to provide a rectangular body portion receivable within a complementary access formed within a supporting wall, said body portion including a side wall and two end walls and having the ends of said blank disposed in planar relation to provide a second side wall and spaced apart to provide a gap allowing for the contraction of said clip body incident to assembly within said access, means formed from the upper end of said clip body for engaging said clip to said supporting wall, separate depending inwardly inclined stud engaging tabs formed from the lower end of said clip body and in particular from said side walls and extending substantially the full width thereof across said clip body in converging relation and apart therefrom; and said stud member being generally circular in cross-section and of substantially less diameter than the length of said stud engaging tabs such that said stud member may be received and retained by said tabs in any position in which said stud member is inserted in said stud retaining clip, said gap extending diagonally across said second side wall and a corner of one of said depending tabs, leaving said one tab of an uninterrupted width comparable to that of the other of said depending tabs.

References Cited in the file of this patent

UNITED STATES PATENTS

| | | |
|---|---|---|
| 2,156,003 | Tinnerman | Apr. 25, 1939 |
| 2,244,975 | Tinnerman | June 10, 1941 |
| 2,244,977 | Hansman | June 10, 1941 |
| 2,438,499 | Hartman | Mar. 30, 1948 |
| 2,560,530 | Burdick | July 10, 1951 |
| 2,741,938 | Johnson | Apr. 17, 1956 |
| 2,797,720 | Mann | July 2, 1957 |

FOREIGN PATENTS

| | | |
|---|---|---|
| 646,406 | Great Britain | Nov. 22, 1950 |